United States Patent
Ephremides et al.

(10) Patent No.: US 9,318,232 B2
(45) Date of Patent: Apr. 19, 2016

(54) MATRIX SPECTRAL FACTORIZATION FOR DATA COMPRESSION, FILTERING, WIRELESS COMMUNICATIONS, AND RADAR SYSTEMS

(75) Inventors: Anthony Ephremides, Bethesda, MD (US); Gigla Janashia, Tbilisi (GE); Levan Janashia, legal representative, Tbilisi (GE); Lasha Ephremidze, Tbilisi (GE); Edem Lagvilava, Tbilisi (GE)

(73) Assignee: University of Maryland, College Park, MD (US)

( * ) Notice: Subject to any disclaimer, the term of this patent is extended or adjusted under 35 U.S.C. 154(b) by 1005 days.

(21) Appl. No.: 12/989,736

(22) PCT Filed: May 1, 2009

(86) PCT No.: PCT/US2009/002719
§ 371 (c)(1),
(2), (4) Date: Jan. 12, 2011

(87) PCT Pub. No.: WO2009/134444
PCT Pub. Date: Nov. 5, 2009

(65) Prior Publication Data
US 2013/0260697 A1    Oct. 3, 2013

Related U.S. Application Data

(60) Provisional application No. 61/050,045, filed on May 2, 2008.

(51) Int. Cl.
*H01B 1/10* (2006.01)
*G06F 17/16* (2006.01)
*H04N 19/635* (2014.01)

(52) U.S. Cl.
CPC ........ *H01B 1/10* (2013.01); *G06F 17/16* (2013.01); *H04N 19/635* (2014.11)

(58) Field of Classification Search
USPC .......................................................... 702/191
See application file for complete search history.

(56) References Cited

U.S. PATENT DOCUMENTS

| | | | |
|---|---|---|---|
| 7,657,038 B2 * | 2/2010 | Doclo et al. | 381/94.1 |
| 2004/0071363 A1 | 4/2004 | Kouri et al. | |
| 2007/0036202 A1 * | 2/2007 | Ge et al. | 375/141 |
| 2008/0294308 A1 * | 11/2008 | Watson | 701/21 |
| 2009/0067520 A1 * | 3/2009 | Gallizio et al. | 375/260 |

OTHER PUBLICATIONS

J. Scott Goldstein, a New Method of Wiener Filtering and its Application to Interference Mitigation for Communications, 1997 IEEE, 5 pages.*
PCT International Search Report (Form PCT/ISA/210), International Application No. PCT/US09/02719, Date of Mailing: Jun. 24, 2009, Date of Completion: Jun. 14, 2009, pp. 1-2.
Written Opinion of the International Searching Authority application No. PCT/US09/02719 dated Nov. 2, 2010.

* cited by examiner

*Primary Examiner* — Tung S Lau
(74) *Attorney, Agent, or Firm* — Squire Patton Boggs (US) LLP

(57) ABSTRACT

A new apparatus, system, and technique for performing Matrix Spectral Factorization has been developed, which can factorize in real time high-dimensional matrices with high-order polynomial or non-rational entries. The method can be used for efficient implementation of engineering solutions to problems in Data Compression, Filtering, Wireless Communications, and Radar Systems, etc., which are computationally reducible to matrix spectral factorization.

12 Claims, 6 Drawing Sheets

501 → Input Pre-computed Measure of Channel Spectral Characteristics [S (z)]

502 → Factorize [S (z)] into two spectral factors; $S^+(z)$ and $S^-(z)$

503 → Determine Filter Coefficients based on the two factors computed in the previous step

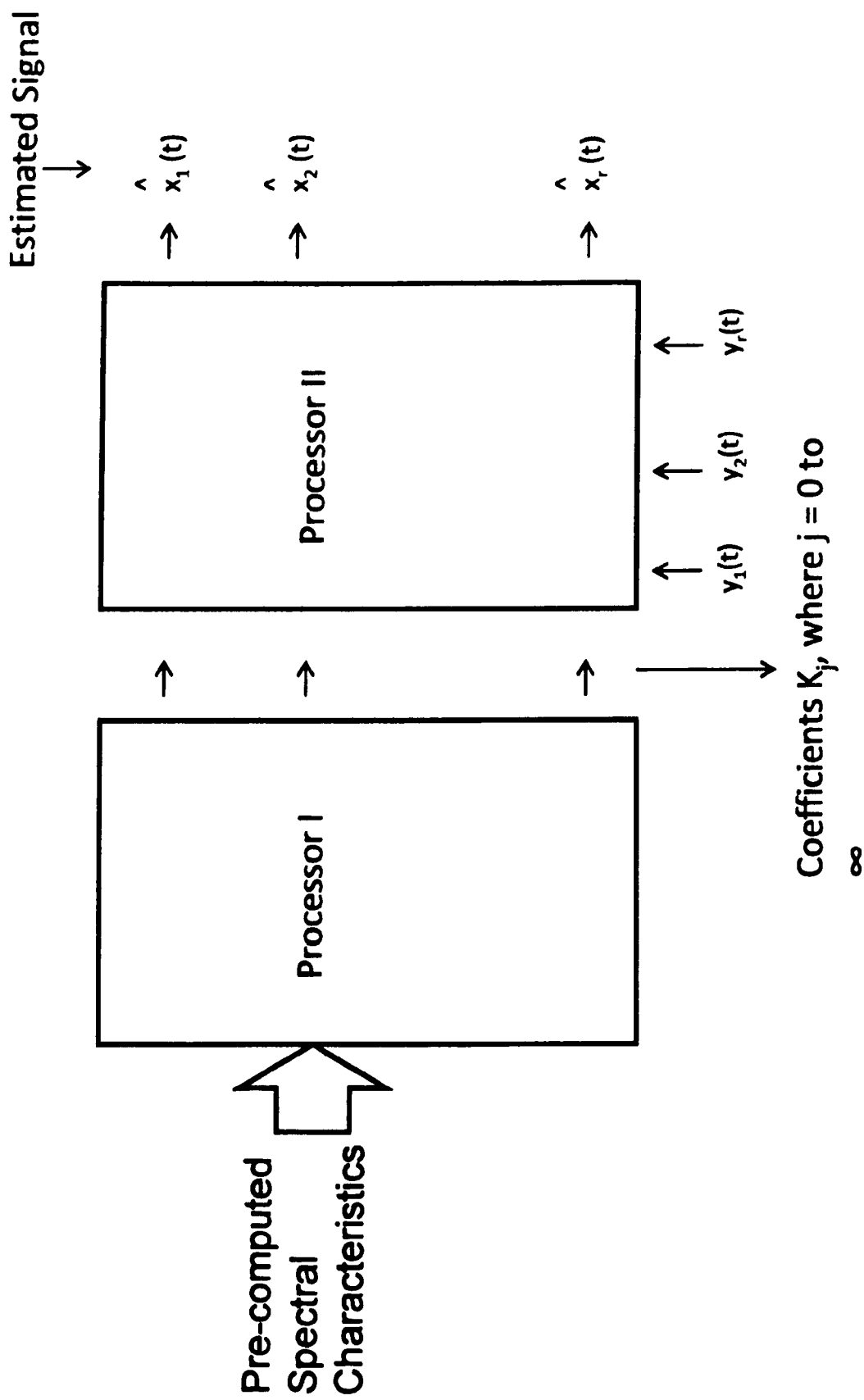

MATRIX SPECTRAL FACTORIZATION FOR DATA COMPRESSION, FILTERING, WIRELESS COMMUNICATIONS, AND RADAR SYSTEMS

CROSS REFERENCE TO RELATED APPLICATIONS

This application is related to and claims the priority of U.S. Provisional Patent Application No. 61/050,045, filed May 2, 2008, the entirety of which is hereby incorporated herein by reference.

BACKGROUND OF THE INVENTION

1. Field of the Invention

Exemplary implementations of the present invention relate to a method of matrix spectral factorization for computer or hardware implementation. The exemplary implementations are therefore systems such as Data Compression systems, Filtering, Wireless Communications, and Radar Systems.

2. Description of the Related Art

Spectral factorization is the cornerstone for enabling a variety of methods that perform filter design, prediction, and estimation and that lead to hardware or software implementations of products that realize these applications. A Wiener filter, proposed by Norbert Wiener, is designed to reduce the amount of noise present in a signal by yielding the best estimate of the desired noiseless signal.

Although such a filter concept was initially proposed in the 1940's, practical algorithms for implementing Wiener filters in certain scenarios have proved challenging particularly for cases of data compression, signal filtering, wireless communication, and radar system in which multi-dimensional signals are present (such as when high-dimensional matrices with high-order polynomial or non-rational entries are present), and there is a long-felt need for improved algorithms to implement such filters, thereby rendering them practical.

SUMMARY OF THE INVENTION

An exemplary implementation of the present invention is an apparatus. The apparatus includes a receiver configured to receive a signal whose characteristics are described by means of a high-dimensional matrix with high-order polynomial or non-rational entries. The apparatus also includes a processor configured to perform Wiener filtering on the received signal. The apparatus further includes a transmitter configured to provide a real-time output of the filtering. This apparatus performs Wiener filtering that employs the needed matrix spectral factorization for an arbitrarily high dimension of the signal representation.

Another exemplary implementation of the present invention is an apparatus. The apparatus includes receiving means for receiving a signal whose characteristics are described by means of a high-dimensional matrix with high-order polynomial or non-rational entries. The apparatus also includes processing means for performing Wiener filtering on the received signal. The apparatus further includes transmitting means for providing a real-time output of the filtering. This apparatus performs Wiener filtering that employs the needed matrix spectral factorization for an arbitrarily high dimension of the signal representation.

A further exemplary implementation of the present invention is a method. The method comprises receiving a signal whose characteristics are described by means of a high-dimensional matrix with high-order polynomial or non-rational entries. The method further comprises performing Wiener filtering on the received signal. The method further comprises transmitting an output of the filtering in real-time. The Wiener filtering in this method employs the needed matrix spectral factorization for an arbitrarily high dimension of the signal representation.

An additional exemplary implementation of the present invention is a computer-readable medium encoded with instructions that, when executed on a computing device perform a process. The process comprises receiving a signal whose characteristics are described by means of a high-dimensional matrix with high-order polynomial or non-rational entries. The process further comprises performing Wiener filtering on the received signal. The process further comprises transmitting an output of the filtering in real-time. The Wiener filtering in this process employs the needed matrix spectral factorization for an arbitrarily high dimension of the signal representation.

An additional exemplary implementation of the present invention is a computer-readable medium encoded with instructions that, when executed on a computing device perform a process of computing the spectral factors of a given spectral density matrix function. The process comprises performing a lower-upper triangular factorization of the given matrix-function into a lower triangular and upper triangular matrix. The process further comprises computing the spectral factors by following a recursive operation on the lower triangular matrix determined in the previous step. The process may further include making the computed spectral factor canonical by multiplying it by a unitary matrix.

An exemplary implementation of the present invention is a method and an apparatus for data compression using the matrix spectral factorization.

BRIEF DESCRIPTION OF THE DRAWINGS

For proper understanding of the invention, reference should be made to the accompanying drawings, wherein:

FIG. 6 illustrates an apparatus according to an exemplary implementation of the present invention.

DETAILED DESCRIPTION OF THE EXEMPLARY IMPLEMENTATIONS

Figure 1:
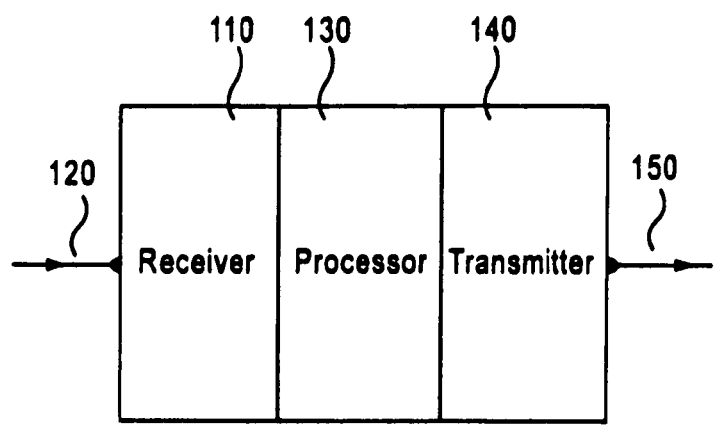
FIG. 1 illustrates a device according to an exemplary implementation of the present invention.

Exemplary implementations of the present invention relate to a new apparatus, system, and method for solving multi-dimensional matrix spectral factorization exactly. Such apparatuses, systems, and methodological solutions may be applied to variety of engineering problems two of which are summarized below. These applications are i) Wiener Filtering and ii) Wavelet Data Compression. These are merely example applications. The need for and use of multi-dimensional spectral factorization for numerous applications is well documented in the literature.

The proposed factorization method can provide a complete solution of the matrix spectral factorization problem. It can permit one of ordinary skill in the art to construct a low computational complexity algorithm for actual computation of the spectral factors which until now was possible only in the scalar case. The matrix spectral factorization can be used, e.g., in estimation of multi-dimensional signals based on noisy observations (filtering) as it arises in guidance and control, in multi-user detection, in cellular wireless telephony, and in many other applications.

Exemplary implementations of the present invention perform the spectral factorization of a matrix-function by factorizing step-by-step the left-upper submatrices of lower dimension. The accuracy of the result can be controlled at each step, which may provide significant benefit for the efficiency of the method. An exemplary implementation of the present invention comprises the following steps for factorizing a matrix function:

a. A lower-upper triangular factorization of the given matrix-function can be performed with corresponding scalar spectral factors on the main diagonal.

b. Further a unitary matrix-function can be found, which converts a corresponding left-upper submatrix into the spectral factor by multiplication from the right. This approach may eliminate the technical difficulties of the problem that inhibited its efficient implementation until now. A close relation of these unitary matrix functions with compactly supported wavelet systems has been revealed.

c. The approximate determination of the aforementioned unitary matrix-function establishes the accuracy level in the solution of a corresponding N×N system of linear equations. This system of linear equations is associated with a positive definite matrix, which allows further reduction of the computational burden. As N tends to infinity the algorithm converges to the exact result and we can determine the size of N in order to achieve a given accuracy.

The above exemplary algorithm can be used for any dimensional matrix function for which a spectral factorization exists, including non-rational matrices. Experiments have indicated that sufficiently high order matrices can be factorized on-line within good accuracy. On the other hand, off-line calculations can be performed within any desired accuracy for matrices of arbitrary dimension. The method can handle so called singular cases as well: where the determinant of the associated matrix has zeros on the boundary. Next, we describe this exemplary implementation in more detail.

A matrix spectral density $S(z)$, $|z|=1$, defined in the unit circle of the complex plane admits the spectral factorization $$S(z)=S^+(z)S^-(z), \qquad (1)$$

where $S^+(z)$, $|z|<1$, is an optimal analytic matrix-function and $S^-(z)=\overline{(S^+(1/\bar{z}))}$, $|z|>1$.

An exemplary implementation of the present invention provide a fast, reliable computation of $S^+(z)$ whenever $S(z)$ is given. It can be applied to design a solution to every engineering problem in which practical implementation requires on-line spectral factorization of high dimensional matrix functions. A few such examples are provided below, and these examples would apprise one of ordinary skill in the art of related examples, all of which and any of which could be considered various exemplary implementations of the present invention.

Although the formulation and solution of spectral factorization problem presented in the various exemplary implementations of the present invention is given for spectral densities defined in the unit circle of the complex plane, which corresponds to analysis of discrete situations, it can be naturally extended (considering the conformal mapping $$z \to \frac{(1+z)}{(1-z)})$$

to spectral densities defined on the imaginary axis, which involves the analysis of continuous situations as well (see, e.g., [14]).

Mathematical Description for an Exemplary Implementation of the Invention (Also Referred to Later in this Application as the Method of Matrix Spectral Factorizaton)

For a given matrix spectral density which is a positive definite matrix-function $$S(z) = \begin{pmatrix} f_{1,1}(z) & f_{1,2}(z) & \ldots & f_{1,r}(z) \\ f_{2,1}(z) & f_{2,2}(z) & \ldots & f_{2,r}(z) \\ \vdots & \vdots & \vdots & \vdots \\ f_{r,1}(z) & f_{r,2}(z) & \ldots & f_{r,r}(z) \end{pmatrix}, \qquad (2)$$

$|z|=1$, with integrable entries, $f_{ij}(z) \in L_1(T)$, satisfying the Paley-Wiener condition $$\log \det S(z) \in L_1(T),$$

a method according to an exemplary implementation approximately computes the canonical spectral factor $S^+(z)$ (from which $S^-(z)$ can be obtained), i.e. the analytic matrix-function $$S^+(z) = \begin{pmatrix} s^+_{1,1}(z) & s^+_{1,2}(z) & \ldots & s^+_{1,r}(z) \\ s^+_{2,1}(z) & s^+_{2,2}(z) & \ldots & s^+_{2,r}(z) \\ \vdots & \vdots & \vdots & \vdots \\ s^+_{r,1}(z) & s^+_{r,2}(z) & \ldots & s^+_{r,r}(z) \end{pmatrix}$$

with entries from the Hardy space $H_2$, given by $$S^+_{ij}(z) = \sum_{n=0}^{\infty} \rho_n^{ij} z^n, \; |z|<1,$$

where $\Sigma_{n=0}^{\infty}|\rho_n^{ij}|^2 < \infty$, and that satisfy that det $S^+(z)$ is an outer function, $S^+(0)$ is positive definite, and $$S(z)=S^+(z)(S^+(z))^* \text{ for } a.a. \; z \in T.$$

A method for carrying out the above factorization is as follows:

Procedure 1 (Triangular Factorization).

Perform the lower-upper triangular factorization of the given matrix spectral density $S(z)$ shown in (2). This can be done in standard algebraic way and by using the scalar spectral factorization for the diagonal terms. Let $$S(z) = M(z)(M(z))^*, \qquad (3)$$

where $$M(z) = \begin{pmatrix} f_1^+(z) & 0 & \ldots & 0 & 0 \\ \zeta_{21}(z) & f_2^+(z) & \ldots & 0 & 0 \\ \vdots & \vdots & \vdots & \vdots & \vdots \\ \zeta_{r-1,1}(z) & \zeta_{r-1,2}(z) & \ldots & f_{r-1}^+(z) & 0 \\ \zeta_{r1}(z) & \zeta_{r2}(z) & \ldots & \zeta_{r,r-1}(z) & f_r^+(z) \end{pmatrix}.$$

The functions $f_m^+(z)$, $m=1, 2, \ldots, r$, are canonical scalar spectral factors of $$\frac{\det S_m(z)}{\det S_{m-1}(z)},$$

where $S_0(z)=1$ and $S_m(z)$ is the left-upper m×m submatrix of $S(z)$. More specifically, one can compute $$f_m^+(z) = \exp\left(\frac{1}{4\pi}\int_0^{2\pi}\frac{e^{i\theta}+z}{e^{i\theta}-z}(\log\det S_m(e^{i\theta}) - \log\det S_{m-1}(e^{i\theta}))d\theta\right).$$

The other entries $\zeta_{ij}$ in (3) can be found by the standard algebraic way when performing the lower-upper triangular factorization of the given matrix spectral density $S(z)$ shown in (2).

Procedure 2 (Recurrent Construction).

The method proceeds recurrently with respect to m, making the left-upper m×m submatrix of $M(z)$ analytic, i.e., performing the spectral factorization of the left-upper m×m submatrix of $S(z)$. Thus, from m=2 until m=r step by step do the following:

Step 1 (Preparing an Auxiliary Matrix).

The next nonanalytic row can be separated in $M(z)$, and included in a special m×m matrix of the form $$F_m(z) = \begin{pmatrix} 1 & 0 & 0 & \ldots & 0 & 0 \\ 0 & 1 & 0 & \ldots & 0 & 0 \\ 0 & 0 & 1 & \ldots & 0 & 0 \\ \vdots & \vdots & \vdots & & \vdots & \vdots \\ 0 & 0 & 0 & \ldots & 1 & 0 \\ \zeta_1^{(m)}(z) & \zeta_2^{(m)}(z) & \zeta_3^{(m)}(z) & \ldots & \zeta_{m-1}^{(m)}(z) & f_m^+(z) \end{pmatrix}, \quad (4)$$

where $\zeta_1^{(m)}(z), \zeta_2^{(m)}(z), \ldots, \zeta_{m-1}^{(m)}(z) m f_m^+(z)$ entries of the m th row of the matrix $M_{m-1}(z)$. It is assumed that $M_1(z)=M(z)$ (see (3)) and $M_m(z)$ is prepared in the end of m th iteration, m=2, 3, ..., r (see Step 4).

Step 2 (Cutting the Tails). In order to approximate a nonanalytic part of the functions $\zeta_i^{(m)}(z)$, i=1, 2, ..., m−1 in (4) by finite trigonometric polynomials, these functions can be expanded into the Fourier series and approximated by truncation of the series namely, $$\zeta_j^{(m)}(z) \approx \sum_{n=-N}^{\infty} c_n(\zeta_j^{(m)})z^n, \quad j=1, 2, \ldots, m-1.$$

Where $N=N^{(m)}$ is a (large) positive integer which determines the level of accuracy. For on-line design of the algorithm, N may be optimized according to the available time for calculations.

Step 3 (Construction of Wavelet Matrices). This step is very valuable in certain exemplary implementations of the present invention. Independently from the main goal of factorizing the spectral density, this step can provide an opportunity to construct efficiently the total class of compact wavelet matrices (see Application to Wavelet Compression described later in this application).

In this step, we find a m×m unitary matrix-function $U_m(z)$, $|z|=1$, of the form $$U_m(z) = \begin{pmatrix} u_{11}^{(m)}(z) & u_{12}^{(m)}(z) & \ldots & u_{1m}^{(m)}(z) \\ u_{21}^{(m)}(z) & u_{22}^{(m)}(z) & \ldots & u_{2m}^{(m)}(z) \\ \vdots & \vdots & \vdots & \vdots \\ u_{m-1,1}^{(m)}(z) & u_{m-1,2}^{(m)}(z) & \ldots & u_{m-1,m}^{(m)}(z) \\ \overline{u_{m1}^{(m)}(z)} & \overline{u_{m2}^{(m)}(z)} & \ldots & \overline{u_{mn}^{(m)}(z)} \end{pmatrix}, \quad (5)$$

where $$u_{ij}^{(m)}(z) = \sum_{n=0}^{N} a_n^{(mij)}z^n, \quad (6)$$

(the entries of the last row are $u_{mj}^{(m)}(z) = \sum_{n=0}^{N} \overline{\alpha_n^{(mmj)}} z^{-n}$ in (5)), such that $\det U_m(z)=1$, and $F_m(z) \cdot U_m(z)$ is analytic.

The coefficients $\alpha_n^{(mij)}$ in (6) can be determined as follows. Let $1=(1, 0, 0, \ldots, 0)^T$, $$\frac{1}{f_m^+(z)} = \sum_{n=0}^{\infty} d_n z^n, \quad |z| < 1,$$

$$\zeta_j^{(m)}(z): \sum_{n=-\infty}^{\infty} \gamma_{jn} z^{-n}, \quad j=1, 2, \ldots, m-1,$$

$$F = \begin{pmatrix} d_0 & d_1 & d_2 & \ldots & d_{N-1} & d_N \\ 0 & d_0 & d_1 & \ldots & d_{N-2} & d_{N-1} \\ 0 & 0 & d_0 & \ldots & d_{N-3} & d_{N-2} \\ \ldots & \ldots & \ldots & \ldots & \ldots & \ldots \\ 0 & 0 & 0 & \ldots & 0 & d_0 \end{pmatrix},$$

$$\Gamma_j = \begin{pmatrix} \gamma_{j0} & \gamma_{j1} & \gamma_{j2} & \ldots & \gamma_{j,N-1} & \gamma_{jN} \\ \gamma_{j1} & \gamma_{j2} & \gamma_{j3} & \ldots & \gamma_{jN} & 0 \\ \gamma_{j2} & \gamma_{j3} & \gamma_{j4} & \ldots & 0 & 0 \\ \ldots & \ldots & \ldots & \ldots & \ldots & \ldots \\ \gamma_{jN} & 0 & 0 & \ldots & 0 & 0 \end{pmatrix},$$

j=1, 2, ..., m−1,
$\Theta_j = F \cdot \Gamma_j$, j=1, 2, ..., m−1, and $\Theta_m = I_{N+1}$,
where $I_n$ is the identity matrix of order n, and
$\Delta = \Theta_1 \cdot \Theta_1^* + \Theta_2 \cdot \Theta_2^* + \ldots + \Theta_{m-1} \cdot \Theta_{m-1}^* + I_{N+1}$.

Solve m systems of (N+0×(N+1) algebraic linear equations with the same coefficients matrix and different right-hand sides, $$\Delta \cdot X = \Theta_j \cdot 1, j=1,2,\ldots m. \quad (7)$$

$\Delta$ is always positive definite and has the displacement rank m (which reduces the computational burden for its solution from $O(N^3)$ to $O(mN^2)$, see [10], Appendix F, which is hereby incorporated herein by reference in its entirety). Denote m solutions of (7) by $X_j$, j=1, 2, ..., m. Identifying polynomials $P(z) = \sum_{n=0}^{N} p_n z^n$ with vectors $(p_0, p_1, \ldots, p_N)$ from $R^{N+1}$ yields $u_{mj}^{(m)}(z) = \overline{X_j}, j=1,2,\ldots, m,$ $u_{ij}^{(m)}(z) = \Theta_i * \cdot X_j, j=1,2,\ldots,m, i \neq j, i=1,2,\ldots,m-1,$ and $u_{ij}^{(m)}(z) = \Theta_i * \cdot X_j - F \cdot 1, j=1, 2, \ldots, m-1.$ Using these $u_{ij}^{(m)}(z)$ and constructing $U'_m(z)$ according to (5) yields $$U_m(z) = U'_m(z) \cdot (U'_m(1))^{-1}. \quad (8)$$

$U'_m(1)$ is the value of matrix-function $U'_m(z)$ in 1, which is never singular.

Step 4 (Iterative Step). This step allows the increase in the dimension of considered submatrices by 1. In this step, take $$M_m(z) = M_{m-1}(z) \cdot \begin{pmatrix} U_m(z) & 0 \\ 0 & I_{r-m} \end{pmatrix},$$

where $U_m(z)$ is determined in Step 3 by (5).

As mentioned above, $M_m(z)$ is used back in Step 1 when the number of iterations m increases by 1.

Once we reach a stage in the algorithm where m=r, it is assumed that $$M_r(z) = M_{r-1}(z) \cdot U_r(z). \tag{9}$$

The analytic matrix-function (9) is now an approximate spectral factor of (2). As N→∞ in step 2, the difference between the computed and the exact spectral factors goes to zero in the $L_2$ norm.

Procedure 3 (the Canonical Spectral Factor). In order to make a spectral factor canonical, it can be multiplied from the right by constant unitary matrix U which makes it positive definite in the origin. Thus $$S^+(z) = M_r(z) \cdot U.$$

In summary there has been described a method according to an exemplary implementation of the present invention, for factorizing a high-dimensional spectral density matrix into two canonical spectral factors. Next, there is described the use of this method to a real-life wireless communications problem. It would be apparent to a person of ordinary skill in the art that the exemplary method discussed above could well be applied to many engineering problems and the applications chosen next are mere examples of the most obvious cases where this method could be used.

Application to Wiener Filtering

A signal that is transmitted from a sender to a receiver is often impaired by various forms of distortions. Wiener filtering is a method to recover the original signal as accurately as possible from the received signal. The necessity of this frequently arises in signal detection, prediction, estimation, stochastic control, missile guidance, aircraft stabilization, economic forecasting, seismic data processing, etc.

Wiener filtering is based on a statistical approach. One is assumed to have knowledge of the spectral properties of the existing signals (this knowledge may be obtained through previous measurements), and one seeks the linear time invariant (LTI) filter whose output would yield a signal with minimal mean-squared error compared with the original signal. Wiener filters are characterized by the following:

1. Assumption: Existing signals are jointly stationary stochastic processes with known spectral characteristics or known autocorrelation and cross-correlation
2. The filter may be physically realizable, i.e. causal
3. Performance criterion: minimum mean-square error (MMSE)

Figure 3:
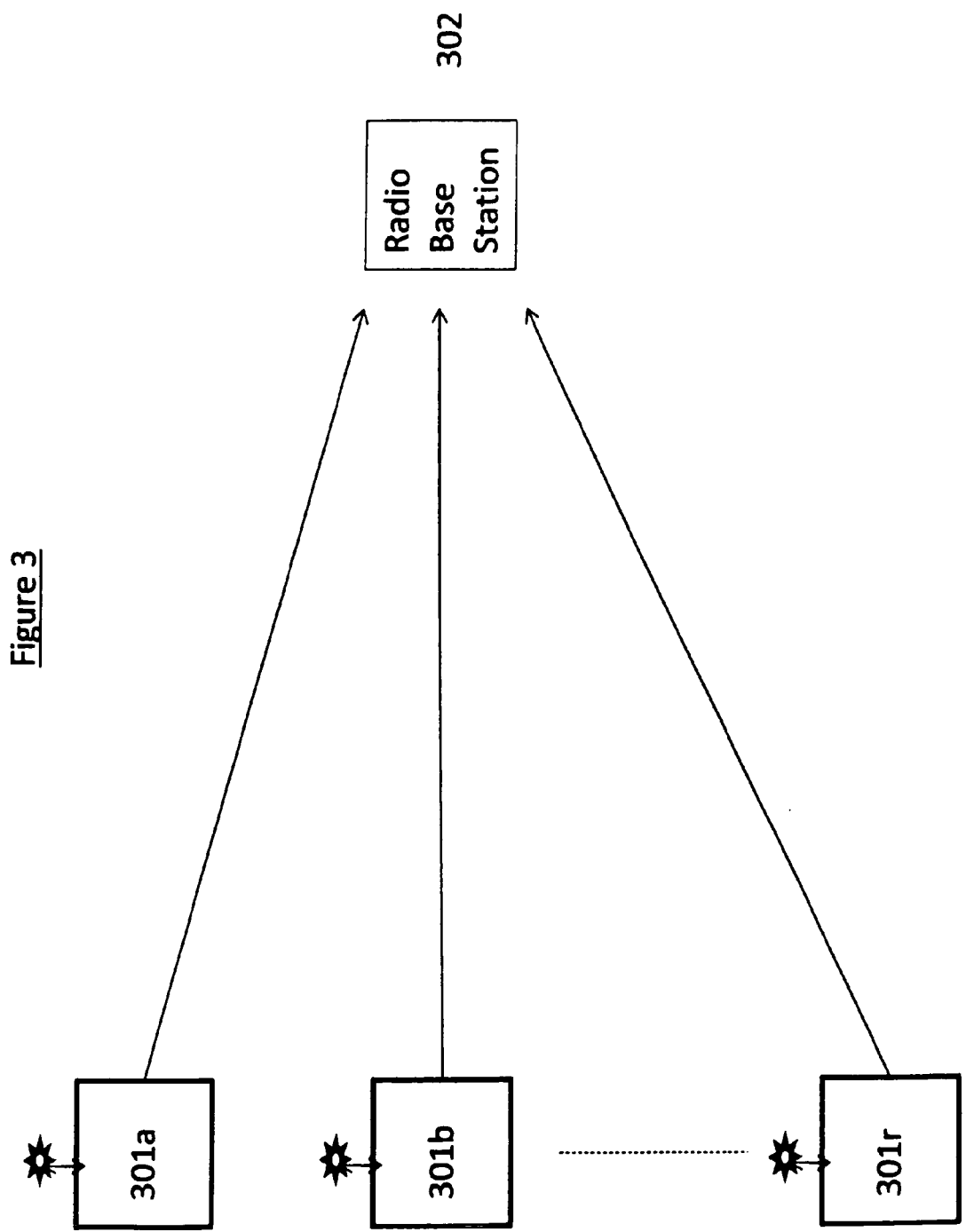
FIG. 3 illustrates a system according to an exemplary implementation of the present invention.

Another exemplary implementation of the present invention is a method for estimating a message from a received signal at a receiver. For example, multiple mobile units 301 (i.e. 301a, 301b . . . 301r) could send messages to a base station as seen in FIG. 3. We need to estimate the messages from the received signals, simultaneously. The total received signal $y_i$ and the actual message $x_i$ and the method of estimating the message are described next. It should be noted that $y_i$ is a multi-dimensional signal. Let $x_i(\omega) = (x_i^{(1)}, x_i^{(2)}, \ldots, x_i^{(r)})^T$ and $y_i(\omega) = (y_i^{(1)}, y_i^{(2)}, \ldots, y_i^{(r)})^T$ m $u = \ldots, -1, 0, 1, \ldots$, be jointly stationary zero mean (without lose of generality) r-dimensional stochastic processes given on a probability space $(\Omega, F, P)$. It is assumed that $x_i$ is a directly unobservable quantity, conventionally called a "message", and $y_i$ is the observed "signal". It can be assumed that $$y_i = x_i + n_i$$

where $n_i$ is an additive "noise", for example, a white gaussian noise. Having access to autocorrelation coefficients $$c_{yy}^{nm}(j) = \int_\Omega y_{i+j}^{(n)}(\omega) \overline{y_i^{(m)}(\omega)} dP \tag{10}$$

and to cross-correlation coefficients $$c_{xy}^{nm}(j) = \int_\Omega x_{i+j}^{(n)}(\omega) \overline{y_i^{(m)}(\omega)} dP, \tag{11}$$

which are assumed to be known or estimated from the "message", the "message" can be estimated from the "signal". The estimated "message"

$$\hat{x}_i = \sum_{j=0}^{\infty} k_j y_{i-j}$$

is obtained by passing $y_i$ through a causal LTI filter K with impulse response $(k_0, k_1, k_2 \ldots)$ and transfer function $$K(z) = \sum_{j=0}^{\infty} k_j z^j \tag{12}$$

which minimizes the error $$e = \|x_i - \hat{x}_i\| = \left\| x_i - \sum_{j=0}^{\infty} k_j y_{i-j} \right\|. \tag{13}$$

The coefficients $k_j$, j=0, 1, . . . , are r×r matrices and they are assumed to be 0 for negative j since the filter is causal. The expression of norm in (13) is usual quadratic norm and it is independent of i because of stationarity.

In order to construct the Wiener filter, the matrix coefficients $k_j$ in (12) which minimizes the error in (13) should be found. An exemplary implementation of the present invention is a method that determines these matrix coeffecients. Since $C_{yy}(i) = (c_{yy}^{nm}(i))_{n,m=1, 2, \ldots, r}$, $-\infty < i < \infty$, are autocorrelation matrix coefficients (see (10)), the method of determining the filter coeffecients includes determining the z-transform $$S(z) = S_{yy}(z) = \sum_{j=-\infty}^{\infty} C_{yy}(j) z^j,$$

which is a positive definite matrix function on the unit circle. The method then performs a spectral factorization $$S(z) = S^+(z) S^-(z)$$

according to the method of matrix spectral factorization described earlier. An equation for determining the filter based on the computed spectral factors is, $$K(z) = \{S_{xy}(z)(S^-(z))^{-1}\}_+ (S^+(z))^{-1}, \tag{14}$$

where $S_{xy}(z)=\sum_{j=-\infty}^{\infty} C_{xy}(j)z^j$, $C_{xy}(i)=(c_{xy}^{nm}(i))_{n,m=1,2,\ldots,r}$ (see (11)), and the operator $\{\bullet\}_+$ is the projection operator defined by $$\left\{\sum_{j=-\infty}^{\infty} c_j z^j\right\}_+ = \sum_{j=0}^{\infty} c_j z^j.$$

This completes the construction of the Wiener filter as the coeffecients can be determined from (14). Further, knowing the construction of the Weiner filter, the message can be estimated by $$\hat{x}_i = \sum_{j=0}^{\infty} k_j y_{i-j}.$$

Note that this procedure could not be implemented using conventional techniques when the signal is multi-dimensional (not scalar or 1-dimensional). However, using a method of Wiener filter design including a method of matrix spectral factorization according to one of the exemplary implementations disclosed in this application, a multi-dimensional case can be handled with ease.

Figure 4:
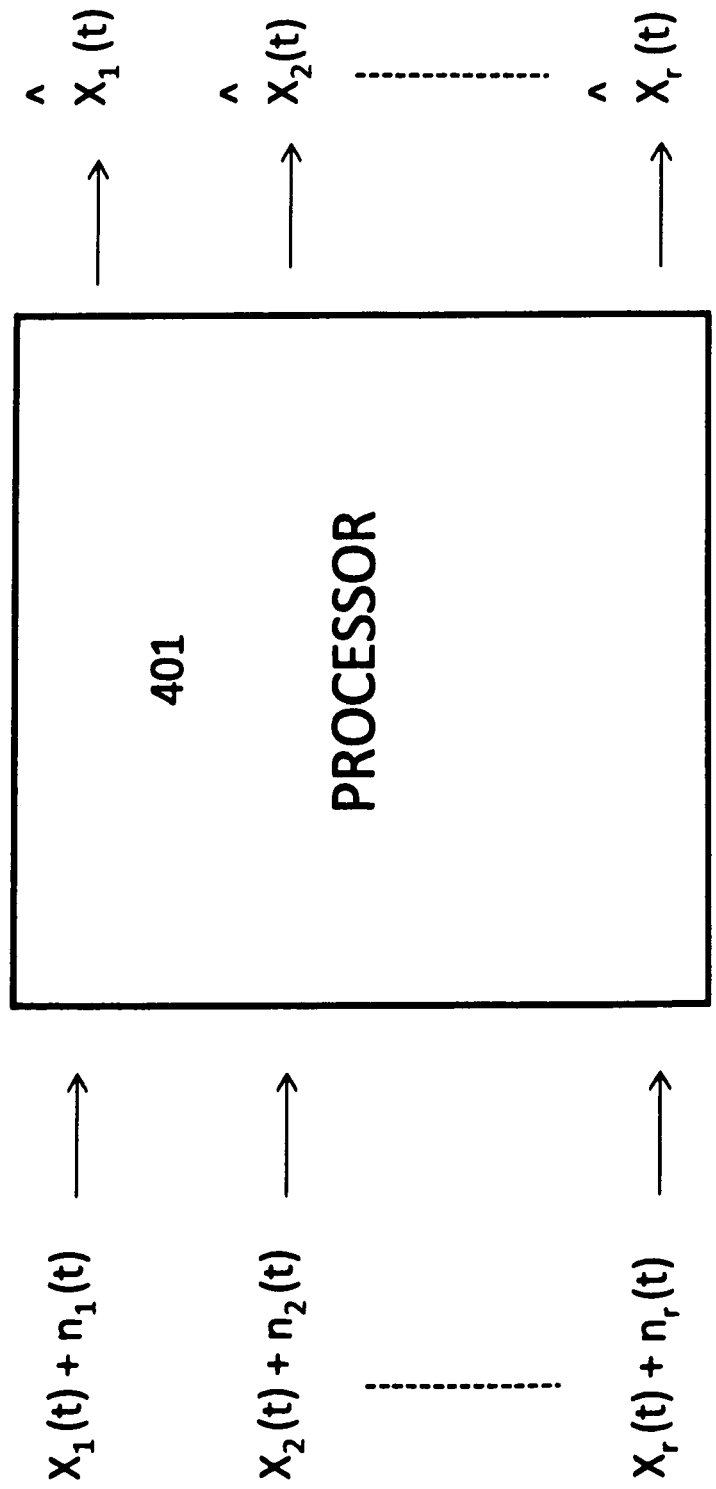
FIG. 4 illustrates an apparatus according to an exemplary implementation of the present invention.

FIG. 4 is an exemplary implementation according to the present invention and it provides for a logic unit such as a processor that takes a noisy signal as an input and provides for an estimate of the message included in the noisy signal. The processor may employ Weiner filtering along with the method of matrix spectral factorization described earlier. The processor may apply other filtering techniques that are computationally reducible to a state where the method of matrix spectral factorization yields spectral factors, which are used in construction of the filter.

Figure 5:
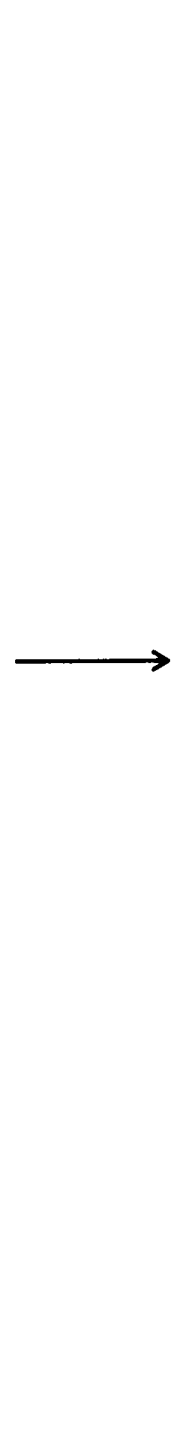
FIG. 5 illustrates a method according to an exemplary implementation of the present invention.

FIG. 5 is another exemplary implementation of the present invention. This implementation provides for a method of determining coefficients for a filter that will allow for estimating a message from a noisy input signal. In this method, 501a pre-computed measure of the channel characteristics (which is in the form of a spectral density matrix function), is factorized 502 into two spectral factors. In 503 the filter coeffecients (which describe the impulse response of the filter) are determined from the spectral factors determined in 502. The precomputed measurements such as the spectral characteristics of the signal are assumed known. In practice they are computed ahead of time based on signal characteristics and channel qualities or by monitoring the source (at the source). For example, the source may be monitored, the characteristics then computed, and then separately communicated to the receiver in order to calibrate the filter correctly. Nonetheless there may be cases where the signal characterisitics are not precomputable and have to be estimated "on-line." This is known as "spectral estimation" and is a well developed field of statistics. More details can be found in the following two sources that are hereby incorporated herein by reference in their entirety:

Basic filtering: A. Papoulis, U. Pillai "Probability, Random Variables, Stochastic Processes" Mc Graw Hill; and T. Kailath, "Lectures on Wiener and Kalman Filtering", CISM monographs, springer Verlag, 1981.

FIG. 6 describes the processor 401 in FIG. 4 in greater detail. It must be noted that the two processors in FIG. 6 may be the same integrated circuit or logic component or may be different integrated circuits or logic components. Specifically, processor 1 may compute the filter coeffecients based on the precomputed spectral characteristics of the channel and/or the incoming signal. The processor 1 may include logic components for receiving the precomputed spectral characteristics, which may be described by a means of a high-dimensional matrix with high-order polynomial or non-rational entries. Processor 1 may also include logic components for computing canonical spectral factors of the received characteristics. Processor 1 may further include logic components for computing filter coefficients using the computed canonical spectral factors. In FIG. 6, the processor 2 may be further decomposed into additional logic components, which perform functions such as taking N samples of the incoming signal $y_i$. These samples would then be output to another logic block within processor 2 that would compute the estimated signal or message based on coefficients of the filter computed by processor 1 and the original input signal $y_i$.

Application to Wavelet Compression

Wavelet compression is a form of data compression using the so-called wavelet transform. It is often employed for compression or coding of structured information, e.g. for compression of image, video or audio signals. The goal is to store the data in as little space as possible. Performing the wavelet transform and removing the coefficients that are outside a theoretical threshold shrinks the existing data performing a lossy compression. Such information is more suitable for storage and transmission. When the inverse wavelet transform is performed, information can be reconstructed without producing significant distortion, if the removed coeffecients for this compression are appropriately selected.

A challenge in every specific practical problem of wavelet compression is to select how to remove the superfluous coeffecients. One important factor in this system is the way one decides which information is "less important" and should be discarded. The short list of known wavelets restricts the area of applications of the compression method described above.

An exemplary implementation of the present invention may provide a complete classification of all wavelets. The computational procedures for on-line construction of such wavelets is given below. Having quick access to the complete bank of compactly supported wavelets, opens the possibility of choosing the best possible selection, thereby maximizing the compression level for a given level of accuracy in signal reconstruction.

A wavelet matrix $A=(a_j^r)$ of rank m and genus g is a rectangular matrix which consists of m rows of formally infinite vectors $$A = \begin{pmatrix} \ldots & 0 & a_0^0 & a_1^0 & \ldots & a_{mg-2}^0 & a_{mg-1}^0 & 0 & \ldots \\ \ldots & 0 & a_0^1 & a_1^1 & \ldots & a_{mg-2}^1 & a_{mg-1}^1 & 0 & \ldots \\ \vdots & \vdots & \vdots & \vdots & \vdots & \vdots & \vdots \\ \ldots & 0 & a_0^{m-1} & a_1^{m-1} & \ldots & a_{mg-2}^{m-1} & a_{mg-1}^{m-1} & 0 & \ldots \end{pmatrix} \quad (15)$$

$a_j^r \epsilon C$, satisfying following two conditions.
  (i) Quadratic Condition:

$$\sum_j a_{j+ml}^r \bar{a}_{j+mn}^s = m\delta^{rs}\delta_{nl}; \quad (16)$$

(Ii) Linear Condition:

$$\sum_{j=-\infty}^{\infty} a_j^r = m\delta^{r,0}, \quad (17)$$

where δ stands for the Kronecker delta (see [12], Sect. 4.2).

For every such matrix A, there is a corresponding scaling function $\phi \epsilon L_2(R)$ with compact support, $$\mathrm{supp}\phi \subset \left[0, (g-1)\left(\frac{m}{m-1}\right)+1\right],$$

which solves the following functional difference equation $$\phi(x) = \sum_{k=0}^{mg-1} a_k^0 \phi(mx-k), \quad (18)$$

as well as corresponding m−1 wavelet functions $\psi^1, \psi^2, \ldots \psi^{m-1}$, defined by the formula $$\psi^r(x) = \sum_{k=0}^{mg-1} a_k^r \phi(mx-k), \quad 1 \le r < m,$$

whose dilations and translations $$\phi_{jk}(x) = m^{j/2}\phi(m^j x - k); j,k \in Z$$

$$\psi_{jk}^r(x) = m^{j/2}\psi^r(m^j x - k); 1 \le r < m; j,k \in Z$$

form the wavelet system W=W[A] (associated with wavelet matrix A).

The existence of such scaling function $\phi=\phi[A]$, which determines the whole system W=W[A] can be proved mathematically (see [12], Th. 5.1), but for practical computations, one can construct an iterative procedure defining $\phi_0 = S_{[0,1]}$, the characteristic function of the interval [0,1], and $$\phi_n(x) = \sum_{k=0}^{mg-1} a_k^0 \phi_{n-1}(mx-k),$$

n=1, 2, ..., which will readily approximate $\phi = \lim_{n\to\infty} \phi_n$ on a computer (see [12], Ch. 5).

Each system of compactly supported wavelets W corresponds to some wavelet matrix A. Furthermore, in the case of discrete situations, whenever a signal is already sampled, the Discrete Wavelet Transform is applied. The only thing necessary in this commonly widespread case is the knowledge of entries of A in (15). An equivalent way of obtaining the wavelet matrix (15) is to express it in terms of block m×m matrices $$A = (\ldots, 0, A_0, A_1, A_2, \ldots, A_{g-1}, 0, \ldots),$$

where $A_k = (\alpha_{km+s}^r)$, $0 \le s, r \le m-1$, and to associate a polynomial matrix function $$A(z) = \sum_{k=-\infty}^{\infty} A_k z^k. \quad (19)$$

Obviously, there is one-to-one correspondence between the matrices in (15) and the matrix functions in (19).

It can be verified that the quadratic and the linear constraints on A are equivalent, respectively, to the following two conditions on A(z):

$$A(z)A^*(z^{-1}) = mI, \quad (20)$$

where $A^*(z^{-1}) := \sum_{k=-\infty}^{\infty} A_k^* z^{-k}$ is the adjoint of A(z), and $$\sum_{j=1}^{m} A_{ij}(1) = m\delta_{i,1}, \quad 1 \le i \le m, \quad (21)$$

where $A(z) = (A_{ij}(z))_{i,j=1}^m$. One can see from (20) that after normalization A(z) is a unitary (on the unit circle) matrix function. Furthermore, one can easily show that det A(z) is always equal to $cz^d$, where $d \ge g-1$, and generically d=g−1 except some degenerated cases.

Remembering that the construction in Step 3, that yielded a Laurent polynomial (of order N) matrix function $U(z) = U_m(z)$ (see (4)), ensured that the latter is unitary with determinant 1, and satisfying $U_k(1) = I_k$ (see (8)), then it can be concluded that $$A(z) = H \cdot L(z) \quad (22)$$

is a wavelet matrix of rank m and genus N+1, and determinant $z^N$, where L(z) is a polynomial matrix function which is obtained from $U_m(z)$ by multiplying its last row by $z^N$, and H is a canonical Haar wavelet matrix of rank m (see [12, p. 48], the characteristic features of H are that $HH^* = mI_m$ and the first row of H is (1, 1, ..., 1, 1)). Since $L(z)L^*(z^{-1}) = I_m$ and $HH^* = mI_m$, A(z) will satisfy the quadratic condition, and since A(1)=H it will satisfy the linear condition as well.

An exemplary implementation of the present invention provides a method for data compression that includes constructing a generic wavelet matrix A of rank m and genus N+1. The method of constructing the generic wavelet matrix A comprises the following.

1. Construct a matrix function F(z) of the form $$F(z) = \begin{pmatrix} 1 & 0 & 0 & \ldots & 0 & 0 \\ 0 & 1 & 0 & \ldots & 0 & 0 \\ 0 & 0 & 1 & \ldots & 0 & 0 \\ \vdots & \vdots & \vdots & \vdots & \vdots & \vdots \\ 0 & 0 & 0 & \ldots & 1 & 0 \\ \zeta_1(z) & \zeta_2(z) & \zeta_3(z) & \ldots & \zeta_{m-1}(z) & 1 \end{pmatrix}, \quad (23)$$

where $$\zeta_j(z) := \sum_{n=0}^{N} \gamma_{jn} z^{-n}, \quad j = 1, 2, \ldots, m-1,$$

(see (4), where $f^+(z)$ is taken to be 1), i.e. take arbitrarily the coefficients $\gamma_{in}$, i=1, 2, ..., m−1, $0 \le n \le N$.

2. Following the procedures described in Step 3 (see the description of the method of matrix spectral factorization), construct the unitary (on the unit circle) Laurent polynomial matrix function U(z) of form $$U(z) = (u_{ij}(z))_{1 \le i,j \le m}$$

where $$u_{ij}(z) = \sum_{n=0}^{N} a_n^{(ij)} z^n, \quad 1 \le i < m, 1 \le j \le m, \quad (24)$$

$$u_{mj}(z) = \sum_{n=0}^{N} a_n^{(mj)} z^{-n}, \quad 1 \le j \le m, \quad (25)$$

with determinant 1, detU(z)=1, and with property $U(1) = I_m$, such that $$F(z)U(z) \in L_N^+,$$

where $L_N^+$ is the class of polynomials of order N.

3. Consider the polynomial matrix function $$L(z) = \begin{pmatrix} u_{11}(z) & u_{12}(z) & \ldots & u_{1m}(z) \\ u_{21}(z) & u_{22}(z) & \ldots & u_{2m}(z) \\ \vdots & \vdots & \vdots & \vdots \\ u_{m-1,1}(z) & u_{m-1,2}(z) & \ldots & u_{m-1,m}(z) \\ z^N u_{m1}(z) & z^N u_{m2(z)} & \ldots & z^N u_{mk}(z) \end{pmatrix},$$

which is obtained from U(z) by multiplying its last row by $z^N$. Pay attention that det $U(z)=z^N$.

4. The matrix function A(z) defined by the formula (22) will be then a wavelet matrix.

One can show (see [8]) that every non-degenerated wavelet matrix A(z) can be constructed in this manner starting from an approximate matrix as in (23).

As was indicated in Step 3 (see the description of the method of matrix spectral factorization), one can find coefficients $\alpha_n^{(ij)}$ in (24), (25), i.e. determine the entries of wavelet matrix (15), by solving (N+1)×(N+1) linear algebraic equations with positive definite coefficient matrix function which has a displacement structure with displacement rank m. Thus the number of operations required for this construction can be estimated as $O(mN^2)$. As we can see, according to this exemplary implementation wavelet matrices of very high rank m and genus N can be constructed in minimal time, while the range of constructible wavelet matrices is exhaustive. A more detailed discussion of the role of wavelets in signal processing can be found in Stephane Mallat, "A Wavelet Tour of Signal Processing," Academic Press, which is hereby incorporated herein by reference in its entirety.

REFERENCES DISCUSSED OR HELPFUL TO THE DISCUSSION ABOVE

1. N. Wiener and P. Masani, The prediction theory of multivariate stochastic processes, I. Acta Math. 98 (1957), 111-150. II. Acta Math. 99 (1958), 93-137.
2. L. Ephremidze, G. Janashia, and E. Lagvilava, A simple proof of matrix-valued Fejer-Riesz theorem, J. Fourier Anal. Appl. 14 (2009), 124-127 (DOI:10.1007/s00041-008-9051-z).
3. L. Ephremidze, G. Janashia, and E. Lagvilava, An analytic proof of the matrix spectral factorization theorem, Georgian Math. J. 15 (2008), 241-249.
4. L. Ephremidze, G. Janashia, and E. Lagvilava, A new efficient matrix spectral factorization algorithm, SICE Annual Conference 2007, Sep. 17-20, Kagawa University, Japan, pp. 20-24 (CD-ROM).
5. L. Ephremidze, G. Janashia, and E. Lagvilava, A new multivariate spectral factorization algorithm, First SIAM-EMS Conference "Applied Mathematics in our Changing World", Collection of Abstracts, Berlin, 2001, p. 61.
6. L. Ephremidze, G. Janashia, and E. Lagvilava, On approximate factorization of positive definite matrix functions, Uspekhi Mat. Nauk, 54 (1999), 161-162 (in Russian). Translated as Russian Math. Surveys, 54 (1999), 1246-1247.
7. G. Janashia and E. Lagvilava, A method of approximate factorization of positive definite matrix functions. Studia Math. 137 (1999), 93-100.
8. G. Janashia and E. Lagvilava, On factorization and partial indeces of unitary matrix-functions of one class, Georgian Math. J. 4 (1997), 439-442.
9. J. Jezek, M. Hromcik, and M. Sebek, New algorithm for polynomial spectral factor-ization and its practical application, Proceedings of the 6th European Control Conference ECC 2001 CD ROM, paper No. 89.
10. T. Kailath, A. H. Sayed, and B. Hassibi, Linear Estimation. Prentice Hall, Inc. 2000.
11. A. N. Kolmogorov, Stationary sequences in Hilbert space. Bull. Math. Univ. Moscow. 2 (1941), 1-40 (in Russian).
12. H. L. Resnikoff and R. O. Wells, Wavelet Analysis, Springer-Verlag, 1998.
13. A. H. Sayed and T. Kailath, A survey of Spectral Factorization Methods. Numer. Linear Algebra Appl. 8 (2001), 467-496.
14. W. G. Tuel, Computer Algorithm for Spectral Factorization of Rational Matrices, IBM Journal, March 1968, 163-170.
15. N. Wiener, Extrapolation, Interpolation, and Smoothing of Stationary Time Series. Technology Press and Wiley, NY, 1949.

Each of the above references is hereby incorporated herein by reference in its entirety.

Example Implementations

An exemplary implementation of the present invention may be an apparatus, such as a computer device, illustrated in FIG. 1. The apparatus may include a receiver 110 configured to receive a signal input 120 whose characteristics may be described by means of a high-dimensional matrix with high-order polynomial or non-rational entries. This can be expressed, for example, as being that the receiver 110 is configured to receive a signal input describable with a high-dimensional matrix with high-order polynomial or non-rational entries. When it is said that the signal is so describable, it should be understood that it is intended that the signal cannot be characterized more simply. One of ordinary skill in the art will appreciate that the characterization of signals as they occur in wireless communications may be characterized according to this description. Other signals are, of course, not excluded.

The apparatus may also include a processor 130 configured for estimating a message from the received signal using a filtering technique. In the current exemplary implementation the filtering technique is Wiener filtering. A person of ordinary skill in the art would appreciate that many other filtering techniques may be applicable to the problem at hand, namely estimating a message from a received signal. The Wiener filtering according to this exemplary implementation employs the method of matrix spectral factorization described earlier. The processor 130 may be the same physical device as the receiver 110, or the receiver 110 and the processor 130 may be separate physical devices. For example, in one exemplary implementation the processor 130 may be a general purpose processor and the receiver 110 is an input port for the processor. In another example, both the processor 130 and receiver 110 are the same application specific integrated circuit. Other examples are permitted. The processor 130 may be specifically configured to perform matrix calculations and may be provided with suitable logic circuitry and software programming to accomplish matrix mathematics and manipulations described throughout this patent application.

The apparatus can further include a transmitter 140 configured to provide a real-time output 150 of the filtering. The transmitter 140, like the receiver 110, can be implemented either as a discrete physical element or as an integrated component with either or both of the receiver 110 and the processor 130.

Although the above apparatus has been characterized in terms of performing Wiener filtering, one of ordinary skill in the art would appreciate that suitable modifications to the above apparatus could be made to configure the processor 130 to perform the data compression such as wavelet compression.

Figure 2:
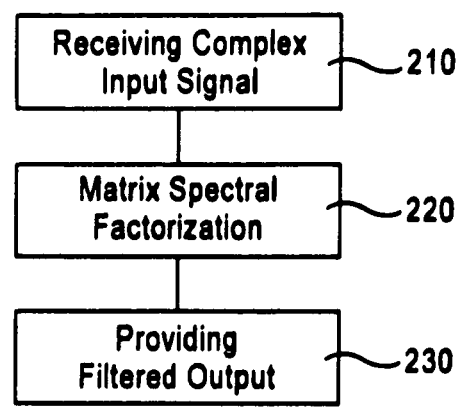
FIG. 2 illustrates a method according to an exemplary implementation of the present invention.

The signal input 120 can be a noisy signal of a wireless communication system (not shown). The output signal from the real-time output 150 can be a repaired version of the received signal from which noise has been removed. FIG. 2 illustrates a method according to an exemplary implementation of the present invention. The method can include receiving 210 a signal input whose characteristics may be described by means of a high-dimensional matrix with high-order polynomial or non-rational entries. The Wiener filtering can employ matrix spectral factorization. The method can also include 220 performing Wiener filtering on the received signal. The method can further include providing 230 a real-time output of the filtering.

The signal input can be, for example, a noisy signal of a wireless communication system. The output signal can be, for example, a repaired version of the received signal from which noise has been removed. Thus, the method can provide a concrete and tangible output signal. The method can be implemented in such a way that each step of the method is performed by a computing device. Thus, one exemplary implementation of the present invention is a computer-readable medium (such as a recording or storage medium) encoded with instructions that, when executed on a computing device perform the method.

One having ordinary skill in the art will readily understand that the invention as discussed above may be practiced with steps in a different order, and/or with hardware elements in configurations which are different than those which are disclosed. The term logic component or logic block may refer to any computing device/element such as integrated circuits or computer readable instructions stored on or in a computer readable medium. Therefore, although the invention has been described based upon these exemplary implementations, it would be apparent to those of ordinary skill in the art that certain modifications, variations, and alternative constructions would be apparent, while remaining within the spirit and scope of the invention as defined by the appended claims.

We claim:

1. An apparatus, comprising:
a receiver configured to receive a signal input;
a processor configured to perform Wiener filtering on the received signal even when the received signal is describable with a multi-dimensional matrix with up to infinite order polynomial or non-rational entries; and
a transmitter configured to provide a real-time output of the filtering,
wherein the Wiener filtering employs matrix spectral factorization, and
wherein the matrix spectral factorization comprises
performing, for a given matrix spectral density, a lower-upper triangular factorization to factor the given matrix spectral density into a first matrix and a conjugate transpose of the first matrix,
recurrently processing the first matrix by preparing an auxiliary matrix considering a submatrix of the first matrix, cutting the tails, constructing wavelet matrices, and increasing a dimension of the considered submatrix, and
applying a canonical spectral factor to a result of the recurrent processing of the first matrix.

2. The apparatus of claim 1, wherein the signal input is a noisy signal of a wireless communication system.

3. The apparatus of claim 1, wherein the output signal is a repaired version of the received signal from which noise has been removed.

4. An apparatus, comprising:
receiving means for receiving a signal input;
processing means for performing Wiener filtering on the received signal even when the received signal is describable with a multi-dimensional matrix with up to infinite order polynomial or non-rational entries; and
transmitting means for providing a real-time output of the filtering,
wherein the Wiener filtering employs matrix spectral factorization, and
wherein the matrix spectral factorization comprises
performing, for a given matrix spectral density, a lower-upper triangular factorization to factor the given matrix spectral density into a first matrix and a conjugate transpose of the first matrix,
recurrently processing the first matrix by preparing an auxiliary matrix considering a submatrix of the first matrix, cutting the tails, constructing wavelet matrices, and increasing a dimension of the considered submatrix, and
applying a canonical spectral factor to a result of the recurrent processing of the first matrix.

5. The apparatus of claim 4, wherein the signal input is a noisy signal of a wireless communication system.

6. The apparatus of claim 4, wherein the output signal is a repaired version of the received signal from which noise has been removed.

7. A method, comprising:
receiving a signal input at a computer;
performing, by the computer, Wiener filtering on the received signal even when the received signal is describable with a multi-dimensional matrix with up to infinite order polynomial or non-rational entries; and
providing, by the computer, a real-time output of the filtering,
wherein the Wiener filtering employs matrix spectral factorization, and
wherein the matrix spectral factorization comprises
performing, for a given matrix spectral density, a lower-upper triangular factorization to factor the given matrix spectral density into a first matrix and a conjugate transpose of the first matrix,
recurrently processing the first matrix by preparing an auxiliary matrix considering a submatrix of the first matrix, cutting the tails, constructing wavelet matrices, and increasing a dimension of the considered submatrix, and
applying a canonical spectral factor to a result of the recurrent processing of the first matrix.

8. The method of claim 7, wherein the signal input is a noisy signal of a wireless communication system.

9. The method of claim 7, wherein the output signal is a repaired version of the received signal from which noise has been removed.

10. A non-transitory computer-readable medium encoded with instructions that, when executed on a computing device perform a process, the process comprising:
receiving a signal input;
performing Wiener filtering on the received signal even when the received signal is describable with a multi-dimensional matrix with up to infinite order polynomial or non-rational entries; and
providing a real-time output of the filtering,
wherein the Wiener filtering employs matrix spectral factorization, and wherein the matrix spectral factorization comprises
performing, for a given matrix spectral density a lower-upper triangular factorization to factor the given matrix spectral density into a first matrix and a conjugate transpose of the first matrix,
recurrently the first matrix by preparing an auxiliary matrix considering a submatrix of the first matrix, cutting the tails, constructing wavelet matrices and increasing a dimension of the considered submatrix, and
applying a canonical spectral factor to a result of the recurrent processing of the first matrix.

11. The non-transitory computer-readable medium of claim 10, wherein the signal input is a noisy signal of a wireless communication system.

12. The non-transitory computer-readable medium of claim 10, wherein the output signal is a repaired version of the received signal from which noise has been removed.

* * * * *